Feb. 19, 1924. 1,483,883
J. T. E. HILLHOUSE
AUTOMATIC CONTROL OF INTERNAL COMBUSTION ENGINES
Filed Nov. 30, 1921    3 Sheets-Sheet 1
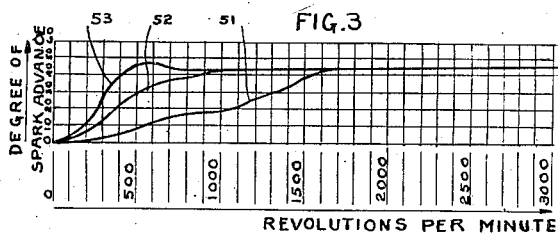
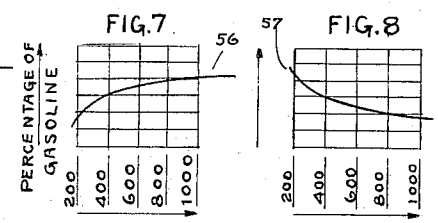
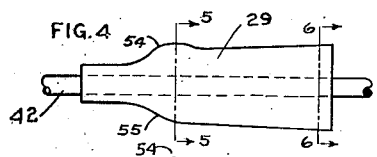
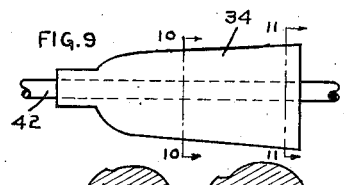
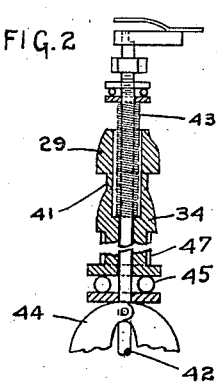
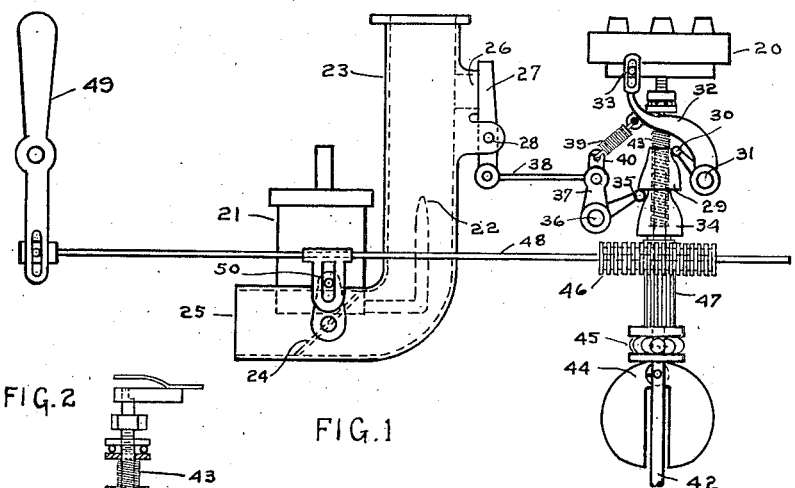
INVENTOR
BY
ATTORNEY Feb. 19, 1924.
J. T. E. HILLHOUSE
1,483,883
AUTOMATIC CONTROL OF INTERNAL COMBUSTION ENGINES
Filed Nov. 30, 1921  3 Sheets-Sheet 2
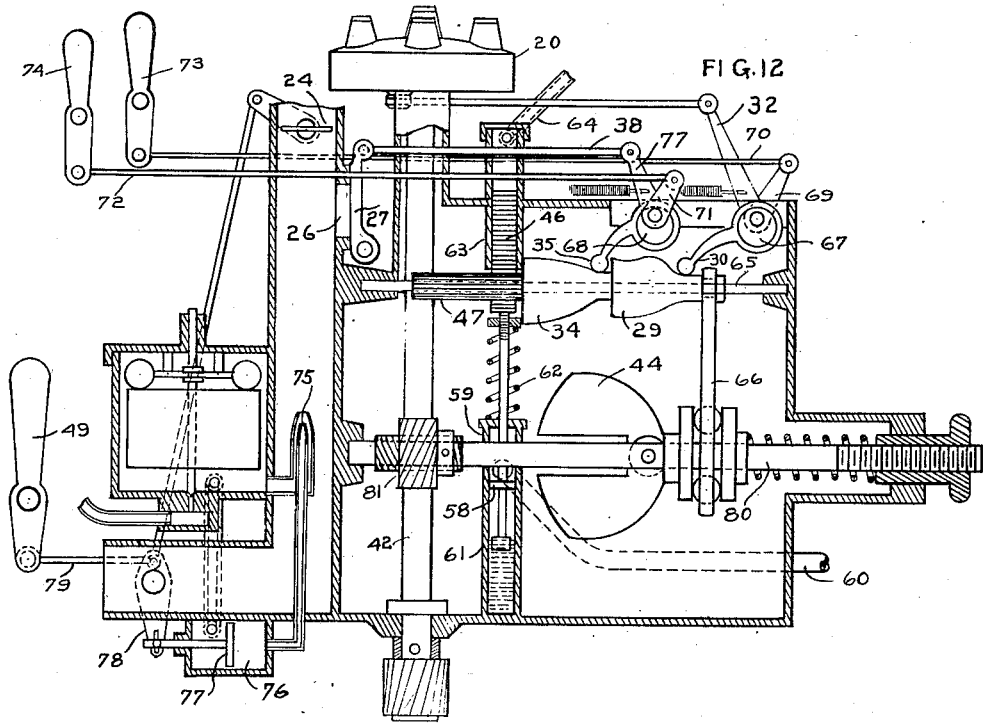
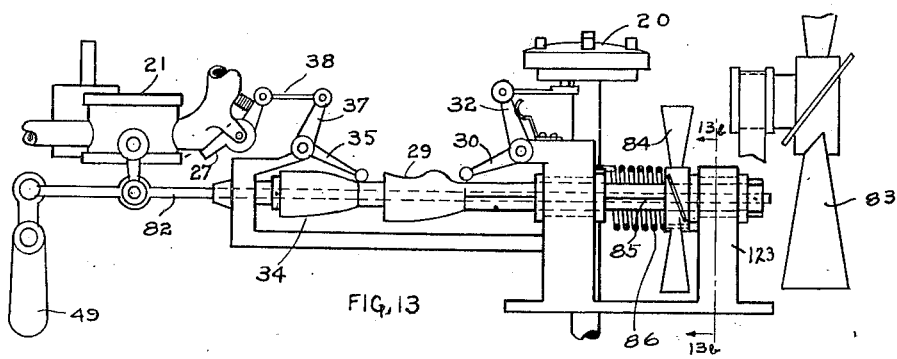
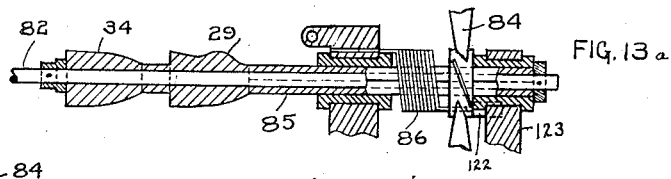
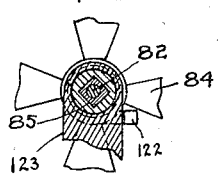
INVENTOR
BY
ATTORNEY

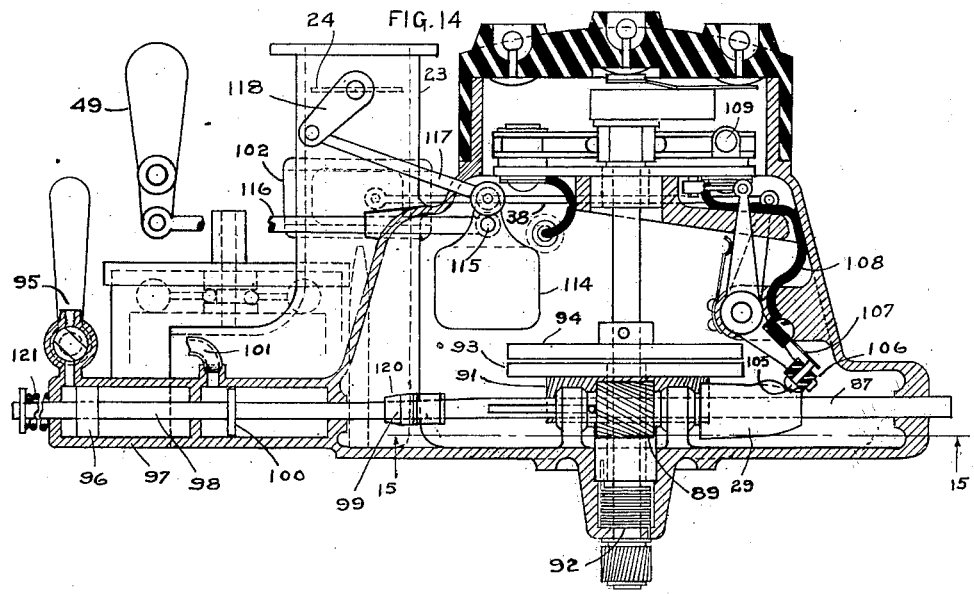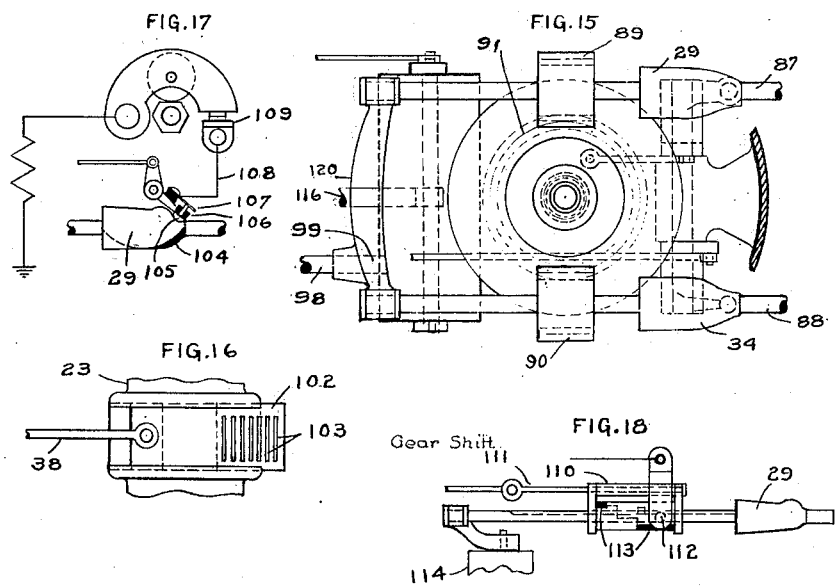

Patented Feb. 19, 1924.

1,483,883

UNITED STATES PATENT OFFICE.

JOHN T. E. HILLHOUSE, OF NEW YORK, N. Y.

AUTOMATIC CONTROL OF INTERNAL-COMBUSTION ENGINES.

Application filed November 30, 1921. Serial No. 518,822.

*To all whom it may concern:*

Be it known that I, JOHN T. E. HILL-HOUSE, a citizen of the United States, and a resident of New York city, county and State of New York, have invented certain new and useful Improvements in Automatic Controls of Internal-Combustion Engines, of which the following is a specification.

My invention relates to the control and operation of internal combustion engines, both as to ignition and carburetion.

One of the principal objects of the invention is to provide simple and effective means for automatically setting the ignition and the mixture of fuel and air at the points of greatest efficiency for existing engine load and speed conditions.

A special feature of the invention is the ultilization of the speed and load functions of the engine to cooperatively adjust the ignition timer and the mixture-proportioning mechanism.

Other objects and novel features of the invention will appear as the specification proceeds.

In the drawings accompanying and forming part of this specification I have illustrated the invention embodied in several different practical forms, but wish it understood that the structure may be further modified and changed without departure from the true spirit and broad scope of the invention.

Figure 1 in the drawings referred to is a somewhat diagrammatic representation of a simple embodiment of the invention.

Figure 2 is a detail sectional view illustrating the mounting of the spark and mixture-controlling cams.

Figure 3 is a diagram of the ignition curves or graphs for degrees of spark advance under the conditions of quarter load, half load and full load respectively throughout the full range of engine speed.

Figure 4 is a side elevation of a cam constructed in accordance with such curves.

Figures 5 and 6 are cross sectional views of the cam taken on substantially the planes of lines 5—5 and 6—6 of Figure 4.

Figure 7 is a diagram of a curve representing the rising percentage of gasoline to air in the fuel mixture at the various degrees of vacuum formed by piston suction in the intake manifold at increasing engine speeds, in the absence of carburetor air relief.

Figure 8 is a curve of air relief for modifying the vacuum of varying engine speeds to maintain a substantially constant vacuum and air and fuel proportion for all engine speeds.

Figure 9 is a side view of a cam constructed in accordance with such curves.

Figures 10 and 11 are cross sectional views on substantially the planes of line 10—10 and 11—11 of Figure 9.

Figure 12 is a cross sectional view illustrative of another commercial embodiment of the invention.

Figure 13 is a side elevation of another modification.

Figure 13$^a$ is a longitudinal section of the same.

Figure 13$^b$ is a cross section as on the plane 13$^b$—13$^b$ of Figure 13.

Figure 14 is a vertical sectional view of a further modified commercial embodiment.

Figure 15 is a fragmentary horizontal sectional view on substantially the plane of line 15—15 of Figure 14.

Figure 16 is a broken detached detail of the air relief slide.

Figures 17 and 18 are fragmentary details of the ignition circuit controlling means.

In the first form of the invention shown I have indicated at 20 an ignition timer of any conventional or special construction, and at 21 a carbureter having a jet or nozzle 22 discharging into the intake 23 and a throttle 24 located between the air inlet 25 and the jet. In addition to this air inlet there is an air relief port 26 located above both the throttle and the jet and controlled in this particular instance by a valve 27 pivotally supported at 28.

The timer is automatically positioned to cause ignition of the charge at the most efficient point by a specially constructed cam 29 engaged by a finger 30 on the rock shaft 31, which latter carries a timer shifting arm 32 having a slotted connection 33 with the adjustable position controlling element of the timer.

The air relief valve is controlled by a specially constructed cam 34 engaged by a finger 35 fixed on a rock shaft 36 carrying an arm 37 connected with the swinging valve by a link 38. A spring 39 connected between an upstanding arm 40 on the rock shaft 36 and the spark advance lever 32 exert tension to hold the fingers engaged with both cams, the air relief valve closed and the timer in the spark-retarded position.

As more clearly shown in Figure 2, both the cams are affixed to or form a part of a sleeve 41 which freely surrounds the rotating timer shaft 42, said sleeve being yieldingly held by an adjustable spring 43 engaged with the weighted arms of a governor 44, a ball-bearing 45 being shown as interposed at this point to relieve friction.

Rotary adjustment of these cams is effected in this disclosure by a rack 46, which may be of completely circular construction as shown, engaging with elongated gear teeth 47 on the periphery of the supporting sleeve, said rack being carried by a slide rod 48 which is actuated by a pivoted handle 49. This slide rod is also connected at 50 to operate the throttle 24. It thus follows that when the handle 49 is shifted, the throttle will be opened or closed more or less and at the same time the spark and mixture-controlling cams will be adjusted rotatably for the load function. It will also be clear that the position of the cams longitudinally or vertically will be determined by and in relation to the engine speed and that the adjustment of the handle 49 to suit different load conditions will not interfere with or in turn be affected by the longitudinal adjustment determined by the engine speed.

To provide the proper degrees of spark advance the cam 29 is constructed to present surfaces which are the equivalent in effect of curves representing the proper degrees of spark advance for different engine loads at all different engine speeds. I have illustrated in Figure 3 one method by which such a cam may be designed. In this diagram the lines 51, 52 and 53 indicate the correct degrees of spark advance for quarter load, half load and full load conditions through the entire range of engine speed. As many other spark advance curves for other load conditions, throughout the speed range of the engine, may be taken as considered necessary or desirable and with these facts acsertained, the cam is then constructed to present along one line, a contour equivalent to or the counterpart of one of such curves and along other lines contours equivalent to the other courves. Thus at the angle of the cam shown in Figure 4, the contour seen at 54 represents the quarter load curve for all engine speeds and the contour seen at 55 represents the curve for half load conditions at all engine speeds. The speed components of these curves extend longitudinally on the cam and the position of the cam longitudinally of its axis is controlled by the speed of the engine. The load conditions on the other hand determine the circumferential positions of the curves on the cam and the position of the cam in this respect is determined by the manipulation of the throttle to meet different load conditions. It follows, therefore, that the cam will be automatically positioned to present to the finger 30 a contour corresponding to existing load and engine speed conditions and that the ignition will be thus automatically timed to operate at the best efficiency.

The carburetion cam 34, like the cam just described, is based on the performance curves of the engine under different load and speed conditions. In Figure 7 the graph 56 indicates the change of proportion between air and gasoline without air relief for varying engine speed at a constant load. In Figure 8 the corrective curve 57 represents the curve of air or vacuum relief necessary to insure a mixture of substantially constant proportion being delivered by the carbureter to the engine for all engine speeds at this load. The cam is constructed from these curves and the curves obtained under other load conditions to operate the air relief valve to maintain the mixture at any desirable proportions within the range of engine operation.

At the present time, a proportion of approximately fifteen parts air to one part gasoline, by weight, is approved by most engineers, but under certain load and speed conditions it may be desirable to depart from such proportions. It will therefore be understood that the carburetion cam need not be designed to maintain this same proportion under all load and speed conditions, but may be designed to admit an additional amount of air sufficient to effect the best results at existing load and speed conditions.

In Figure 12 I have given a somewhat more practical and complete example of the invention. In this view I have used reference characters corresponding to those previously employed so far as possible. One respect in which this form differs from the embodiment first described is that the load function is furnished by cylinder pressure or manifold vacuum of the engine, the rack which turns the cams being actuated in this instance by a piston 58 operating in a cylinder 59 to which engine pressure is led by a connection 60. The lower portion of this cylinder has a dash pot, as indicated at 61, to prevent erratic or unnecessary movements of the piston. An adjustable spring 62 returns the piston to a normal or balanced position. I have indicated at 63 a cylinder containing the upper end of the rack which is formed for the purpose, as a piston under control of engine pressure admitted by a connection 64. The ignition and carburetion cams in this instance are rotatably and slidingly mounted on a horizontal support 65, but are shifted as before by a centrifugal governor connected with the cam carrying sleeve by an outstanding arm 66.

The operation of this form of the invention is the same as previously described in that the load function of the engine controls the rotary displacement of the cams and the speed of the engine controls the longitudinal positioning of the cams so as to set the timer and the air relief valve at the proper points to operate at the best efficiency.

In order that this automatic control may be varied, if desired, I have shown the fingers of the two cams as mounted on eccentric bearings 67 and 68 connected by arms and links 69—70 and 71—72 with manually operable handles 73 and 74. It will be clear that by adjusting these handles 73 and 74 the automatic control of either the spark or the mixture may be varied one way or the other to suit any given conditions.

Another difference to be noted in this second form of the invention is that the throttle is located above the jet and also above the air relief valve and that an auxiliary jet 75 is located within the main jet and connected with an accelerating well 76 in which operates a plunger 77 connected by suitable linkage 78, 79 with the throttle lever 49. The governor shaft 80 in this illustration is disposed horizontally and independent of the timer shaft 42 and is shown as driven therefrom by spiral gearing 81.

The form of the invention shown in Figure 13 differs from those previously described, particularly in that the cams are constructed with the speed components extending circumferentially instead of longitudinally and with the load components arranged longitudinally instead of curcumferentially. This means that under varying loads the cams should be shifted longitudinally and that for different engine speeds they should be adjusted rotatably. The first effect is obtained by connecting the shaft 82 on which the cams are mounted with the throttle lever 49 so as to receive endwise motion therefrom proportionate to the opening of the throttle and hence to the load on the engine and the second or engine speed effect is obtained by causing the blast from the cooling fan 83 to operate on the inclined blades of a fan wheel 84 slidingly engaged on the squared portion 85 of the shaft and having a stop 122 normally tensioned against a stop 123 by the spring 86. With this construction it will be apparent that as the speed of the engine increases, the cam supporting shaft will be turned to advance the spark and to open the air relief valve to an extent predetermined by the longitudinal load factor adjustment of the cams.

The form of the invention illustrated in Figures 14 and 15 is similar to that just described in that the cams are adjusted longitudinally for load and rotatively for speed. In this instance the ignition and carburetion cams 29 and 34 are fixed on the longitudinally adjustable parallel supporting shafts 87 and 88 respectively which have the spiral gears 89 and 90 slidingly keyed thereon and engaged by a master spiral gear 91. This latter gear is tensioned in one direction by a spring 92 and has secured to it an armature disc 93 of soft iron which is opposed to a permanently magnetized disc 94 on the timer shaft. This magnetic coupling provided between the timer shaft and master gear thus provides a speed governed means for rotatably adjusting the ignition and carburetion cams.

The load function for the ignition cam is obtained in this instance by a connection 95 from the engine, supplying pressure in accordance with the load on the engine to a piston 96 operating in a cylinder 97, said piston having a rod 98 coupled at 99 with the cross connection or yoke 120 between cam shafts 87 and 88. The movement of the load function piston may be regulated by an adjustable spring 121 and controlled by a dash pot construction such as I have indicated at 100, the fluid for such dash pot being supplied, for instance, from the water jacket of the engine by suitable connections such as that shown at 101.

The air relief valve in the embodiment under consideration consists of a flat slide 102 covering a port in the side of the intake and having a series of slots or holes 103 therein, any one or all of which may be brought into register with the port. This plural slot construction provides, I believe, a more truly proportionate supply of auxiliary air.

The ignition cam has an additional function in this construction in that it limits the speed at which the engine may be operated. This latter feature is indicated diagrammatically in Figure 17, where it will be seen that the cam has at its high speed portion an insulating section or segment 104 which serves to interrupt the ignition circuit when it comes into engagement with the end of the feeler arm, the latter consisting in this case of a button 105 supported in an insulating bushing 106 in the end of the feeler arm and engaging an insulated spring contact 107 on said arm, which latter is connected by conductor 108 with one of the breaker points 109. From the circuit connections shown in Figure 17 it will be apparent that when the cam is turned so far as to bring the insulated portion into engagement with the insulated contact on the feeler arm, the circuit will be broken and hence the igniter will cease to function and that as soon as the speed is reduced to a point where the metallic portion of the cam engages the feeler contact the ignition circuit will be again restored.

This speed limiting function is particularly important for trucks and tractors, but inasmuch as there are times when it becomes necessary to speed up an engine, as for instance, under hard pulling conditions in low or intermediate gear, I have shown in Figure 18 how a special commutator device 110 may be slidingly keyed on the cam shaft, said device being connected as indicated at 111 with the gear shifting mechanism and being engaged by a contact 112 disposed in the ignition circuit.

With this construction the shifting of the gears positions different portions of the device beneath the circuit contact and when the predetermined proper maximum speed for such a gear ratio is reached, the commutator device will be turned so as to bring one of the insulating portions 113 under the spring contact and thus interrupt the ignition circuit. This permits the engine to be operated up to the maximum proper speed for any gear ratio, but prevents the engine from being raced in any one of the different gear ratios.

In addition to all the foregoing, the embodiment under consideration includes a hill climbing function provided by a weight or pendulum 114 pivotally hung at 115 on a slidingly supported rod 116 connected with the throttle lever 49 and which weight is connected by a link 117 with the arm 118 of the throttle. This construction it will be obvious modifies the operation of the throttle to the extent that upon the approach to an incline the throttle will be automatically opened an extent sufficient to maintain the rate of speed at which the vehicle is then traveling. Conversely, upon approaching a decline, the throttle will be automatically closed to a point sufficient to maintain the desired rate of speed.

What I claim is:

1. In an internal combustion engine, a cam for controlling the spark advance constructed with a cam surface having the contour of a curve for spark advance for a constant engine load through a varying range of engine speed.

2. In an internal combustion engine, a cam for controlling the spark advance having a cam surface constructed along different lines with the contours of spark advance curves for different engine loads at varying engine speed.

3. In an internal combustion engine, a shiftable cam for controlling the spark advance having a cam surface constructed along different lines with the contours of spark advance curves for different engine loads at varying engine speed, a timing element supported for engagement with the several contours, engine speed controlled means for shifting the cam in the direction of the contour curves, and means for shifting the cam to selectively bring different contours into cooperative relation to the timing element.

4. In an internal combustion engine, a cam for controlling the spark advance having a cam surface constructed along different lines with the contours of spark advance curves for different engine loads at varying engine speed, engine speed controlled means for shifting the cam in the direction of the contour curves and engine load controlled means for shifting the cam to bring the different contour curves thereof into action in accordance with existing loads on the engine.

5. In an internal combustion engine, ignition means, a cam for positioning the same having the contours of curves representing degrees of spark advance for different engine loads at varying engine speed and speed controlled and load controlled means for shifting said cam in the direction of the speed and load components of said curves respectively and in accordance with existing speed and load conditions of the engine.

6. In an internal combustion engine, a cam for controlling carburetion having a cam surface which along a definite line has the contour of a curve of the air relief factor for constant engine load at varying engine speed.

7. In an internal combustion engine, a cam for controlling carburetion whose surface along different lines has contours of the air relief factor for different engine loads at varying engine speed.

8. In an internal combustion engine, a cam for controlling carburetion whose surface along different lines has contours of the air relief factor for different engine loads at varying engine speed, speed controlled means for shifting the cam in the direction of the speed components of the contour curves of the cam, air relief means positioned by said cam, and means for shifting the cam in the direction of the load components of the contour curves of the cam.

9. In an internal combustion engine provided with an auxiliary air inlet, a valve governing said auxiliary air inlet and a cam controlling said valve and having contours based on the curves of the air relief factor to provide ratios of fuel to air consumption for different engine speeds and loads.

10. In an internal combustion engine provided with an auxiliary air inlet, a valve governing said auxiliary air inlet, a cam controlling said valve and having contours based on the curves of the air relief factor to provide ratios of fuel to air consumption for different engine speeds and loads and engine speed and load governed means for shifting the cam.

11. In an internal combustion engine provided with an auxiliary air inlet valve and an ignition timer, cams controlled as to position by engine speed and load conditions, one of said cams being connected to operate the timer and having the contours of spark advance curves at different loads and speeds and the other cam being connected to operate the auxiliary air inlet valve and having the contours of the curves of the air relief factor to carburetion at different engine loads and speeds.

12. In an internal combustion engine, an ignition timer, a cam for controlling the position of the same having the contours of curves representing degrees of spark advance for said engine at different speeds under different load conditions, engine controlled means for shifting said cam in accordance with existing speed and load conditions and means associated with said cam for predetermining the maximum speed of the engine.

13. In an internal combustion engine, an ignition timer, a cam for controlling the position of the same having the contours of curves representing degrees of spark advance for said engine at different speeds under different load conditions, engine controlled means for shifting said cam in accordance with existing speed and load conditions, means associated with said cam for predetermining the maximum speed of the engine and gear shifting connections controlling operation of said speed limiting means.

14. The combination with an internal combustion engine having a throttle and manually operable control means for the same, of a grade or gravity controlled device for automatically varying the effect of the manually controlled means upon said throttle.

15. In an internal combustion engine provided with an auxiliary air inlet valve and an ignition timer, cams controlled as to position by engine speed and load conditions, one of said cams being connected to operate the timer and having the contours of spark advance curves at different loads and speeds. and the other cam being connected to operate the auxiliary air inlet valve and having the contours of the curves of the air relief factor to carburetion at different engine loads and speeds and means for arbitrarily varying the effect of said automatic control.

16. In an internal combustion engine provided with an auxiliary air inlet valve and an ignition timer, a cam controlling the ignition timer and having active contours based on ignition curves for different engine loads under different speed conditions, a cam operably connected with the air relief valve and having contours based on air relief curves for different engine loads under different speed conditions, engine load and speed governed means for positioning said cams and independent means for arbitrarily positioning said cams.

17. In an internal combustion engine provided with an auxiliary air inlet valve and an ignition timer, a cam controlling the ignition timer and having active contours based on ignition curves for different engine loads under different speed conditions, a cam operably connected with the air relief valve and having contours based on air relief curves for different engine loads under different speed conditions, engine load and speed governed means for positioning said cams, said cams being connected together to move as a unit for existing load and engine speeds.

18. In an internal combustion engine, an ignition timer and a cam for positioning said timer provided with means for disrupting the ignition circuit for said timer.

19. In an internal combustion engine a cam for controlling the operation of said engine having contours based on the curves of engine performance under different load and speed conditions and engine governed means for automatically shifting said cam in accordance with existing engine load and speed conditions.

20. In an internal combustion engine, a cam for controlling the operation of said engine having contours based on the curves of engine performance under different load and speed conditions, engine governed means for automatically shifting said cam in accordance with existing engine load and speed conditions and means for arbitrarily positioning the cam independently of such automatic control.

21. In an internal combustion engine, a cam for controlling the operation of said engine having contours based on the curves of engine performance under different load and speed conditions, engine governed means for automatically shifting said cam in accordance with existing engine load and speed conditions and grade controlled means for exerting an automatic control over the engine.

22. In an internal combustion engine, a cam for controlling the operation of said engine having contours based on the curves of engine performance under different load and speed conditions and engine governed means for automatically shifting said cam in accordance with existing engine load and speed conditions, said cam further having means for limiting the maximum speed of the engine.

23. In an internal combustion engine, a cam for controlling carburetion, whose surface along different lines has contours of the air relief factor for different engine loads at varying engine speed, engine speed controlled means for shifting the cam in the direction of the contour curves of the air relief factor and engine load controlled means for shifting the cam to bring the different contour curves thereof into action in accordance with the existing load upon said engine.

24. In an internal combustion engine, carburetion means, a cam for positioning the same having the contours of the curves representing the degree of the air relief factor in carburetion for different engine loads at varying engine speed and speed and load controlled means for shifting said cam respectively in the direction of the speed and load components of said curves and in accordance with the existing speed and load conditions upon the engine.

25. In an internal combustion engine, a cam for controlling the spark advance having the contours of curves representing degrees of spark advance for different engine loads and varying engine speeds, a timing element for engagement with said several contours and speed controlled and load controlled means for relatively shifting said cam and timing element in the direction of the speed and load components of said curves respectively in accordance with existing speed and load conditions of the engine.

26. In an internal combustion engine, a cam for controlling carburetion whose surface along definite lines has contours of the air relief factor for different engine loads at varying engine speed, a carburetion controlling member for engagement with said several contours and speed and load controlled means for relatively shifting the cam and carburetion controlling member in the direction of the speed and load components of said curves respectively in accordance with existing speed and load conditions of the engine.

27. In an internal combustion engine, a cam for controlling the spark advance constructed with a cam surface having the contour of a curve for spark advance for a constant engine load through a varying range of engine speed, a timing element for engagement with said cam surface and means for relatively shifting said cam and timing element.

28. In an internal combustion engine, a cam for controlling carburetion having a cam surface which along a definite line has the contour of a curve of the air relief factor for constant engine load and varying engine speed, a carburetion controlling member for engagment with said cam surface and means for relatively shifting said cam and carburetion controlling member in accordance with existing conditions of the engine.

29. In an internal combustion engine, an ignition timer, a cam for controlling the position of the same having the contours of curves representing degrees of spark advance for said engine at different speeds under different load conditions, a member connected with said timer and adapted for engagement with the several contours of the cam, engine controlled means for relatively shifting said cam and member in accordance with existing speed and load conditions and means associated with the cam for predetermining the maximum speed of the engine.

30. In an internal combustion engine, a cam for controlling the spark advance having the contours of curves representing degrees of spark advance for different engine loads and varying engine speeds, a timing element for engagement with said several contours and speed controlled and load controlled means for relatively shifting said cam and timing element in the direction of the speed and load components of said curve respectively in accordance with existing speed and load conditions of the engine and manually operated means for arbitrarily controlling the spark advance.

31. In an internal combustion engine, a cam for controlling carburetion whose surface along definite lines has contours of the air relief factor for different engine loads at varying engine speed, a carburetion controlling member for engagement with said several contours and speed and load controlled means for relatively shifting the cam and carburetion controlling member in the direction of the speed and load components of said curves respectively in accordance with existing speed and load conditions of the engine and manually operated means for arbitrarily governing the carburetion.

32. In an internal combustion engine, a cam for controlling the operation of said engine having contours based on the curves of engine performance under different load an engine controlling member for engagement with said contours and engine governed means for relatively shifting said cam and engine controlling member in accordance with existing engine load and speed conditions.

33. In an internal combustion engine, a cam for controlling the operation of said engine having contours based on the curves of engine performance under different load and speed conditions, an engine controlling member for engagement with said contours, engine governed means for relatively shifting said cam and engine controlling member in accordance with existing engine load and speed conditions and means for relatively positioning said cam and member arbitrarily and independently of said automatic control.

In witness whereof, I have hereunto set my hand this 22nd day of November, 1921.

JOHN T. E. HILLHOUSE.